United States Patent [19]

Anstötz et al.

[11] 4,392,288

[45] Jul. 12, 1983

[54] DEVICE FOR ACTION ON WEBS OF MATERIAL WITH AT LEAST ONE CYLINDER

[75] Inventors: Helmut Anstötz, Tönisvorst; Klaus Kubik, Krefeld; Heinz Paulussen, Mönchengladbach, all of Fed. Rep. of Germany

[73] Assignee: Eduard Küsters, Krefeld, Fed. Rep. of Germany

[21] Appl. No.: 278,457

[22] Filed: Jun. 29, 1981

[30] Foreign Application Priority Data

Jun. 28, 1980 [DE] Fed. Rep. of Germany ....... 3024570

[51] Int. Cl.³ ............................................. B21B 13/14
[52] U.S. Cl. ............................................. 29/116 AD
[58] Field of Search ......... 29/113 R, 113 AD, 116 R, 29/116 AD

[56] References Cited

U.S. PATENT DOCUMENTS

| | | | |
|---|---|---|---|
| 4,030,177 | 6/1977 | Hold | 29/116 AD |
| 4,154,160 | 5/1979 | Küsters | 29/116 AD |
| 4,198,994 | 4/1980 | Germain | 29/116 AD X |
| 4,206,700 | 6/1980 | Stoltz et al. | 29/116 AD X |
| 4,299,162 | 11/1981 | Hartmann et al. | 29/116 AD X |

*Primary Examiner*—Eugene F. Desmond
*Attorney, Agent, or Firm*—Kenyon & Kenyon

[57] ABSTRACT

In a device for acting on webs of material which includes at least one roll, which comprises a revolving hollow cylinder constituting the working roll circumference, a crosshead going through the cylinder with spacing on all sides, and against which the hollow cylinder is braced by means of a fluid pressure medium contained in its interior between the crosshead and the inside of the hollow cylinder in at least one chamber, force members which operate in the action plane of the roll and engage the ends of the crosshead protruding from the hollow cylinder, or corresponding points of a counter roll, and a control for holding the forces exerted by the fluid pressure medium on the one hand and by the force members on the other hand substantially in equilibrium, force measuring cells are inserted between the force members and the ends of the crosshead or the corresponding points of a counter roll, respectively, which cells substantially transmit the entire exerted force, and means provided for feeding the signal of said cells to the control, so as to result in more accurate control.

10 Claims, 8 Drawing Figures

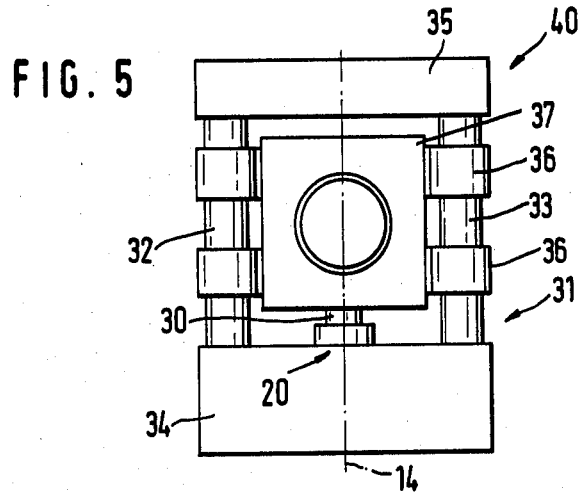
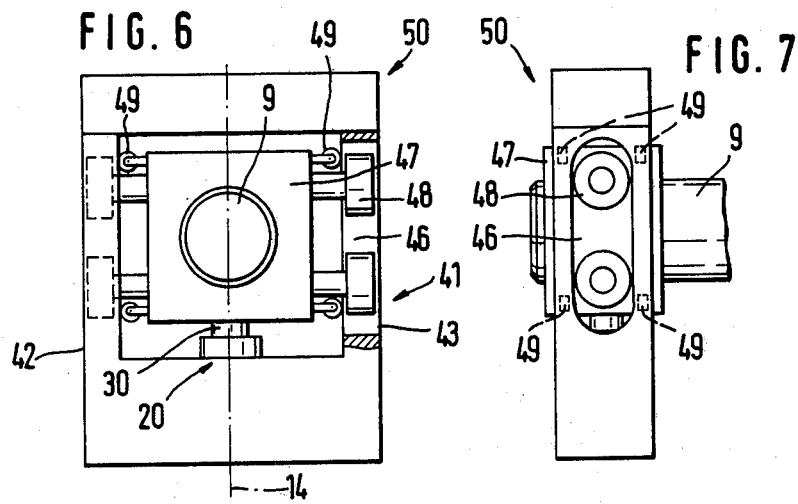
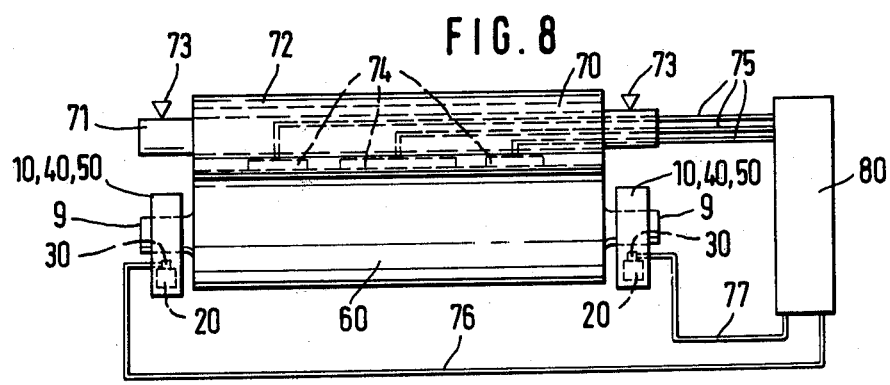

DEVICE FOR ACTION ON WEBS OF MATERIAL WITH AT LEAST ONE CYLINDER

BACKGROUND OF THE INVENTION

This invention relates to devices for acting on webs of material in general and more particularly to an improved device using a roll of the type in which an outer hollow cylinder is braced against a crosshead by means of a fluid pressure medium.

A device for acting on webs of material comprising: at least one roll, which comprises a revolving hollow cylinder constituting the working roll circumference; a crosshead going through the cylinder with spacing on all sides, and against which the hollow cylinder is braced by means of a fluid pressure medium contained in its interior between the crosshead and the inside of the hollow cylinder in at least one chamber; force members which operate in the action plane of the roll and engage the ends of the crosshead protruding from the hollow cylinder, or corresponding points of a counter roll; and a control for holding the forces exerted by the fluid pressure medium, on the one hand, and by the force members, on the other hand, substantially in equilibrium, is known. Different embodiments of this type of device are described, for example, in German Pat. No. 14 11 327, DE-OS No. 26 23 492 and U.S. Pat. No. 3,276,102. The webs of material acted upon by such devices may be of paper, nonwoven fabric, textiles, plastic foils or similar materials and are preferably subjected to a pressure treatment by the device. In addition to pressure treatments, however, other actions may also be considered, for instance, support on support rolls of a support roll winding device.

The bending of rolls of the type including a hollow cylinder surrounding a cross-head can be controlled, so that the cylinders are capable of exerting uniform line pressure. Examples of rolls in which bending is controlled can be found in German Pat. No. 1 026 609; U.S. Pat. No. 2,395,915, and DE-AS Nos. 11 93 792; 15 61 706, and 22 30 139.

If such a roll cooperates, for instance, with a counter roll, force members for bringing the rolls together can engage either at the ends of the crosshead of the roll under consideration, which protrude from the hollow cylinder, or also at the corresponding points of the counter roll. The force members usually comprise hydraulic or pneumatic piston/cylinder units. The pressure which prevails in these piston/cylinder units must be in a given relationship to the pressure in the chamber of the hollow cylinder of the roll if equilibrium is to prevail. Otherwise, proper running of the roll is not possible; rather, if the hollow cylinder is supported on the crosshead by antifriction bearings, part of the exerted forces are absorbed by the antifriction bearings which are thereby stressed heavily. In embodiments with a hollow cylinder not supported in bearings, it is improperly displaced relative to the cross section.

Control systems have, therefore, been developed which keep the pressures, those bringing the rolls together and those within the hollow cylinder, in a certain relationship to each other. Examples for such control systems can be seen from the above-mentioned patents.

In the known embodiments, the pressure of the pison/cylinder units is used as a basis for control. This pressure does not accurately represent the forces exerted on the ends of the cylinder because the friction in the piston/cylinder unit is a factor. In the case of more stringent requirements as to the accuracy of the control, such errors are noticeable. As only one example, in a calender roll, very low line pressures must be run, in which friction errors in the rolls can lead to significant errors.

It is an object of the present invention to increase, in a device of this type, the accuracy of the distribution of the forces exerted by the force members and the force exerted by the pressure medium in the chamber.

SUMMARY OF THE INVENTION

According to the present invention, this problem is solved by inserting force measuring cells between the force members and the ends of the crosshead or the corresponding points of a counter roll, respectively, which cells substantially transmit the entire exerted force, and feeding the signal of said cells to the control.

The force measuring cells permit direct determination of the actually transmitted forces of the force members without friction being noticeable. In this manner the ratio of the forces exerted on the cylinder ends and in the cylinder can be set substantially more precisely. This is true for the case where the forces exerted by the force members are the control variable, as well as for the case where the forces transmitted in the chamber are the control variable.

Although the present invention is disclosed in a design in which the force members are piston/cylinder units, it also covers other embodiments, for instance, those in which pneumatic force members or purely mechanical spindle arrangements are provided.

In one important practical embodiment of the present invention, the measuring cell is disposed in a bearing housing which includes a straight guidance surface. The bearing housing forms a unit closed in itself, in which the force measuring cell can be accommodated relatively easily.

The force measuring member can, for instance, be a hydraulic pressure cell. As used herein a pressure cell is understood to be an arrangement in which the hydraulic pressure present corresponds to the forces exerted on the pressure cell with as little loss as possible. This includes, for instance, a sort of hydraulic pressure cushion or pressure bellows, but no a piston/cylinder unit.

In a preferred embodiment, however, the force measuring cell is formed by an electromechanical force measuring member.

Various force measuring members of this kind are known. They comprise a deformation body, the deformation of which can be converted by a suitable converter, for instance, an attached strain gauge strip, into an electrical quantity which can be used for control purposes.

The boundaries of the bearing housing may be substantially rectangular and straight guidance obtained parallel to one of the side pairs. Such a bearing housing can readily be connected to a machine frame in different arrangements. Different embodiments of the straight guidance devices are also disclosed.

BRIEF DESCRIPTION OF THE DRAWINGS

FIGS. 5 and 6 schematically illustrate views of further embodiments corresponding to FIG. 2.

FIG. 7 is a view according to FIG. 6 from the right.

FIG. 8 is a detailed schematic view of rolls according to the present invention.

DETAILED DESCRIPTION

Figure 1:
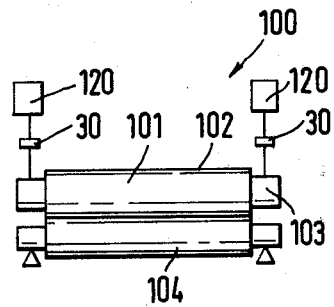
FIG. 1 schematically illustrates the principle of the present invention.

The device 100 of FIG. 1 comprises two cooperating rolls 101 and 104 of which roll 101 comprises a revolving hollow cylinder 102, as well as a crosshead 103 which extends through the former with spacing. At the ends of the crosshead 103 protruding from the hollow cylinder 102, force members designed as hydraulic or pneumatic piston/cylinder units 120 are located engaging the crosshead 103 to press the roll 101 against the counter roll 104. Between the force members 120 and the protruding ends of the crosshead 103, force measuring members 30 are inserted which transmit and measure the entire force exerted by the force members 120.

The hollow cylinder 102 is hydraulically braced on the inside against the crosshead 103, i.e., the radial force stemming from the line pressure is passed from the hollow cylinder 102 to the crosshead 103 via a pressure medium contained in one or more chambers. The pressure of this pressure medium, and therefore, the force acting between the crosshead 103 and the hollow cylinder 102, must be in a certain relationship to the force exerted by the force members 120. For setting this relationship the signal of the force measuring members 30 which represents the force actually exerted on the ends of the crosshead 103 is used. This is not the case with the pressure prevailing in the force members 120 because, in these, an error occurs due to the friction of the force members.

The further Figures illustrate how this principle can be implemented in a practical manner.

Figure 2:
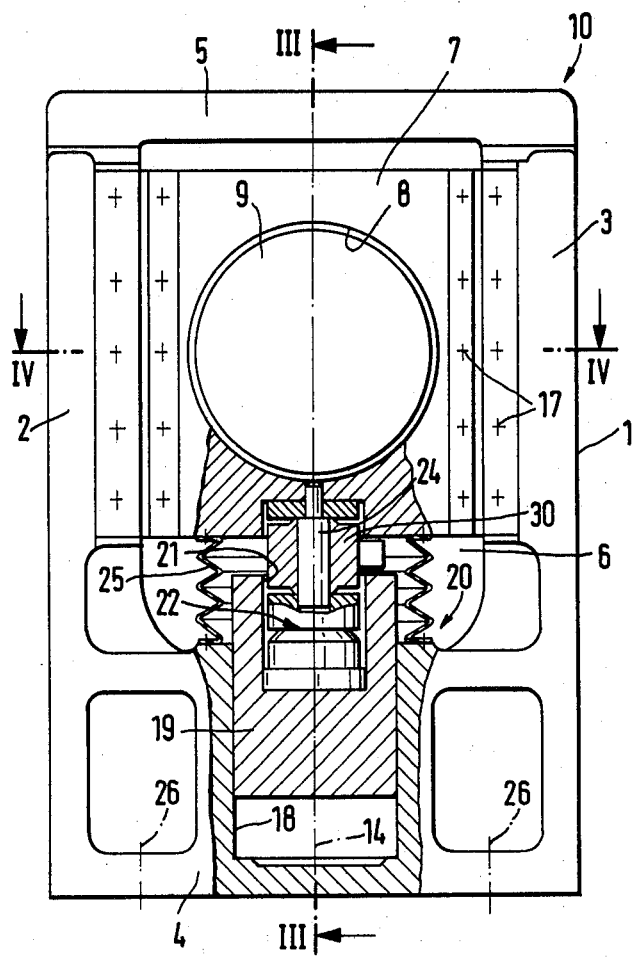
FIG. 2 is a side view of a bearing housing according to the present invention, partly in cross section.
Figure 3:
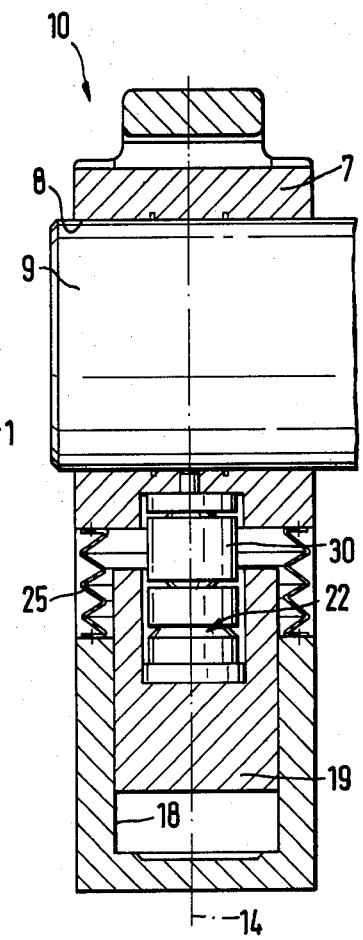
FIG. 3 is a cross section taken along the line III—III in FIG. 2.
Figure 4:
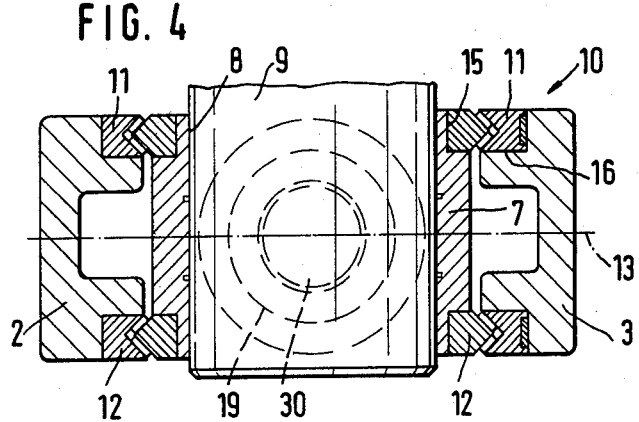
FIG. 4 is a cross section taken along the line IV—IV in FIG. 2.

According to FIGS. 2-4, a cylinder, for instance, of a calender, surrounds a bearing housing 10 at each end. The bearing housing 10 has a U-shaped frame 1 with two legs 2 and 3 and a cross piece 4. The free ends of the legs 2 and 3 are connected to each other by a traverse 5, so that the frame 1 forms a stable assembly which is closed in itself.

A bearing body 7 which has an opening 8 extending perpendicular to the plane of the frame for receiving a journal 9 is arranged in the empty interior 6 of the frame 1. Bearing body 7 is movably guided parallel to the axis 14 which is vertical in FIGS. 2 and 3, by two pairs of prismatic guides 11 and 12 which are arranged symmetrically to the center plane 13 which extends parallel to the plane of the frame. The prismatic guides 11 and 12 are designed as needle guides and are arranged in recesses 15 and 16 at the opposite vertical edges of the bearing body 7 or the legs 2 and 3 of the frame 1, and are fastened by means of screws 17, which are only indicated. It may also be sufficient to provide only one pair of prismatic guides 11 and 12 on one side of the center plane 13 or in the center plane 13.

The cross piece 4 of the frame 1 has a certain height and contains a cylindrical hole 18 which is located on the axis 14 and in which the piston 19 of a piston/cylinder unit 20 is arranged. The cylindrical hole 18 has a feedline for pressure oil, not shown.

The piston 19 protrudes in the interior 6 of the frame 1 toward the bearing body 7. It has on its outside a recess 21 in which a spherical segment 22 is accommodated which transmits the force of the piston 19 to the bearing body 7 via an electromechanical force measuring cell 30 which, for instance, works with wire strain gages. The force measuring cell 30 is centered via a post 24 which is located on the axis 14 and engages the upper part of the spherical segment arrangement 22 as well as the underside of the bearing body 7. The spherical segment arrangement 22 make it possible for the force exerted by the piston 19 to be applied, symmetrically to the axis and, thereby, to lead to an exact determination of the force in the force measuring cell 30. The force measuring cell 30 and the force transmission region are protected from contamination by bellows 25.

In FIGS. 5-7, embodiments in which the guide of the bearing body in the frame like housing is designed differently, as shown.

The frame 31 of the bearing housing according to FIG. 4 comprises two parallel columns 32 and 33 with a cross piece 34. A traverse 35 connects the columns 32 and 33 on the opposite side to form a closed frame, in the interior of which the bearing body 37 is guided movably in the direction of the axis 14 and at the columns 32 and 33 via ball bushings 36. In the illustrated embodiment, two ball bushings 36 are arranged on each of the columns 32 and 33 one above the other with a spacing; single, longer ball bushings can also be considered, of course. With respect to the arrangement of the piston/cylinder unit 20 in the cross piece 34 and the force measuring cell 30, the bearing housing 40 is identical with the bearing housing 10.

In FIGS. 6 and 7, a bearing housing 50 is shown in which guide slots 46 extending parallel to the plane of the frame are worked out from legs 42 and 43 of a frame 41 and in which guide rollers 48 mounted to the bearing body 47 can move and guide the bearing body 47, together with rollers 49 which are arranged in the frame plane and roll off at the inside of the legs 42 and 43 opposite each other. This embodiment also corresponds to the bearing housing 10 with respect to the piston/cylinder unit 20 and the force measuring cell 30.

It is a common feature of all embodiments 10, 40 and 50 that the bearing body 7, 37 or 47, respectively, is guided in a frame 1, 31 or 41 via rolling bodies, i.e., with a purely rolling motion and without appreciable friction losses, so that the force determined by the force measuring cell 30 corresponds almost exactly to the force actually transmitted on the roll journal 9.

This is important so that actual control of the functions of a cylinder, such as is shown in FIG. 8, which is hydraulically braced on the inside, can be obtained.

In FIG. 8, a device with two cooperating rolls 60 and 70, for instance, a calendar or a smoothing mechanism is shown, of which the lower roll 60 with the roll journal 9 is a solid roll which is supported at each of the two ends in bearing housings 10, 40 or 50 of the above-described type. The upper roll 70 is a roll with controlled flexure, with a crosshead 71 and a hollow cylinder 72 surrounding the latter with spacing. The roll 70 is firmly supported at a machine stand at the ends of the crosshead protruding from the hollow cylinder 72, as is to be indicated by the triangle 73. On the action side of the roll 70, chambers 74 are formed in the interior between the crosshead 71 and the inside circumference of the hollow cylinder 72, which are sealed laterally and to which pressure oil is fed via the feedline 75; the oil transmits its pressure to the inside circumference of the hollow cylinder 72 and braces the latter against the crosshead 71. In this embodiment, the chambers 74 can be acted upon separately by different pressures in order to influence the bending of the hollow cylinder 72.

Instead of the three chambers 74 shown, more chambers or only one chamber which extends over the entire length, or pressure shoes which are acted upon by pistons guided in cylindrical holes of the crosshead 71 may also be provided.

The contact pressure in the device according to FIG. 8 is furnished by the piston/cylinder units 20 of the roll 60. This contact pressure must be in a given relationship to the force exerted by the pressure oil in the chamber 74, since otherwise the hollow cylinder 72 would be displaced in a detrimental manner transversely to the crosshead 71. This requires a control device 80, which receives the signals which are determined by the force measuring cells 30 and essentially correspond to the forces actually supplied, via the lines 76 and 77 as the input signal, and calculates therefrom the correct pressures and makes them available on the lines 75, so that the total force exerted in the chambers 74 is at equilibrium with the total force exerted by the piston/cylinder units 20.

A further important point is the compactness which is common to all bearing housings 10, 40 and 50 and which manifests itself especially because the guide elements 11, 12, 36, 48 and 49 engage the bearing body laterally and the piston/cylinder unit 20 is provided only on one side. In this manner, the outline of the bearing housings 10, 40 and 50 each forming a closed assembly, can be kept so small that it does not protrude beyond the roll, particularly in the direction of the axis 14, i.e., in the direction of the operating plane of the roll so that it is possible to mount rolls with the bearing housings 10, 40 and 50 without disturbing the bearing housings of adjacent rolls. It is, therefore, possible to integrate further rolls in existing devices as well as to build up devices with several rolls merely by connecting the respective bearing housings 10, 40 or 50 to each other, without providing a machine frame proper which would hold all the rolls. The connecting elements, for instance, threaded bolts, engage the frames 1, 31 or 41 which have, for this purpose, a substantially rectangular outline so that mounting surfaces are provided everywhere. Mounting screws are indicated in FIG. 1 at 26.

In spite of their compactness, the bearing housings 10, 40 and 50 can, in a simple manner, with a clean design, accommodate the force measuring cells 30 which are not easy to accommodate in other roll bearing systems.

What is claimed is:

1. In a device for acting on webs of material comprising: at least one roll, which comprises a revolving hollow cylinder constituting the working roll circumference; a crosshead going through the cylinder with spacing on all sides, and against which the hollow cylinder is braced by means of a fluid pressure medium contained in its interior between the crosshead and the inside of the hollow cylinder in at least one chamber; force members which operate in the action plane of the roll and engage the ends of the crosshead protruding from the hollow cylinder, or corresponding points of a counter roll; and a control for holding the forces exerted by the fluid pressure medium on the one hand and by the force members on the other hand substantially in equilibrium, the improvement comprising: force measuring cells inserted between the force members and the ends of the crosshead or the corresponding points of a counter roll, respectively, which cells substantially transmit the entire exerted force; and means for feeding the signal of said cells to the control.

2. The improvement according to claim 1, comprising: a bearing housing at each end of the roll to be acted upon by the force members for receiving only said roll, having a bearing body; means guiding said bearing body in the bearing housing at a straight line guide in the operating plane of the cylinder; said bearing body receiving the roll journal or the end of the crosshead protruding from the hollow cylinder; and said force member and said force measuring cell arranged between the bearing body and the bearing housing.

3. The improvement according to claim 2, wherein said force member is a piston/cylinder unit which can be operated by means of a fluid pressure medium and is arranged with its axis in the operating plane perpendicular to the cylinder axis.

4. The improvement according to claim 3, wherein said cylinder is disposed in the bearing housing, and said piston acts against the bearing body with the interposition of the force measuring cell.

5. The improvement according to claim 1, wherein said force measuring member is a hydraulic pressure cell.

6. The improvement according to claim 1, wherein said force measuring member is an electromechanical force measuring member.

7. The improvement according to claim 2, wherein said bearing housing has substantially rectangular boundaries on the outside and the straight line guide extends parallel to one of the pairs of sides.

8. The improvement according to claim 2, wherein said straight line guide comprises at least one pair of prismatic guides which are opposite each other on both sides of the operating plane.

9. The improvement according to claim 2, wherein said straight line guide comprises at least one pair of guide columns which are opposite each other on both sides of the operating plane and at which the bearing body is guided by means of ball bushings.

10. The improvement according to claim 2, wherein said straight line guide comprises at least one pair of guide slots which are opposite each other on both sides of the operating plane and in which the bearing body is guided by means of engaging elements, for instance, sliding blocks or rollers.

* * * * *